Oct. 7, 1958          F. D. BRADDON          2,854,850

LIQUID FLOATED GYROSCOPIC APPARATUS

Filed May 21, 1954          2 Sheets-Sheet 1

INVENTOR
FREDERICK D. BRADDON
BY
Herbert H. Thompson
his ATTORNEY.

Oct. 7, 1958 F. D. BRADDON 2,854,850
LIQUID FLOATED GYROSCOPIC APPARATUS
Filed May 21, 1954 2 Sheets-Sheet 2

INVENTOR
FREDERICK D. BRADDON
BY
Herbert H. Thompson
his ATTORNEY

United States Patent Office 2,854,850
Patented Oct. 7, 1958

2,854,850
LIQUID FLOATED GYROSCOPIC APPARATUS

Frederick D. Braddon, Babylon, N. Y., assignor to Sperry-Rand Corporation, a corporation of Delaware Application May 21, 1954, Serial No. 431,345

13 Claims. (Cl. 74—5)

This invention relates to gyroscopic compasses or other sensitive gyroscopic apparatus, and especially to an improved means for eliminating the disturbing effects of friction in the bearings or other source of disturbing torques originating in the bearing structure, and also due to the effect of acceleration forces on any unbalance in the system about any axis. To overcome the above noted sources of error, it has been proposed to float the entire sensitive element of the gyroscope in a liquid, the buoyancy of which supports the mass of the gyroscopic structure so that there is no or very little weight or other force exerted on the bearings. Heretofore, however, costly and sizeable antifriction bearings had to be retained because the mass under the bearing conditions present was not supported in its entirety by the liquid or it became buoyant or heavy under certain conditions. By my invention, I propose to not only initially construct the device so that it is supported in neutral equilibrium about all axes in the enveloping fluid, but also so that it remains so supported in spite of variations in temperature of the liquid, which otherwise would cause it to tend to sink or float in the liquid and hence exert a force on or about the horizontal and vertical bearings. By thus eliminating all load on the bearings, I may employ cheap and rugged jewel bearings such as employed in watches and clocks for this purpose since their only function is to act as guide bearings about the axes of the gyroscope.

This application is an improvement over the type of liquid immersed gyroscope shown in my prior application 261,508 for Gyroscopic Instrument, filed December 13, 1951, issued January 3, 1956, as Patent No. 2,729,107, and is a continuation-in-part of said prior application as to the common features disclosed.

Referring to the drawings showing my invention as applied to a gyroscopic compass, Fig. 1 is a south elevation looking north of such a gyroscopic compass, the outer housing and follow-up support being shown in section;

Figures 1, 2:
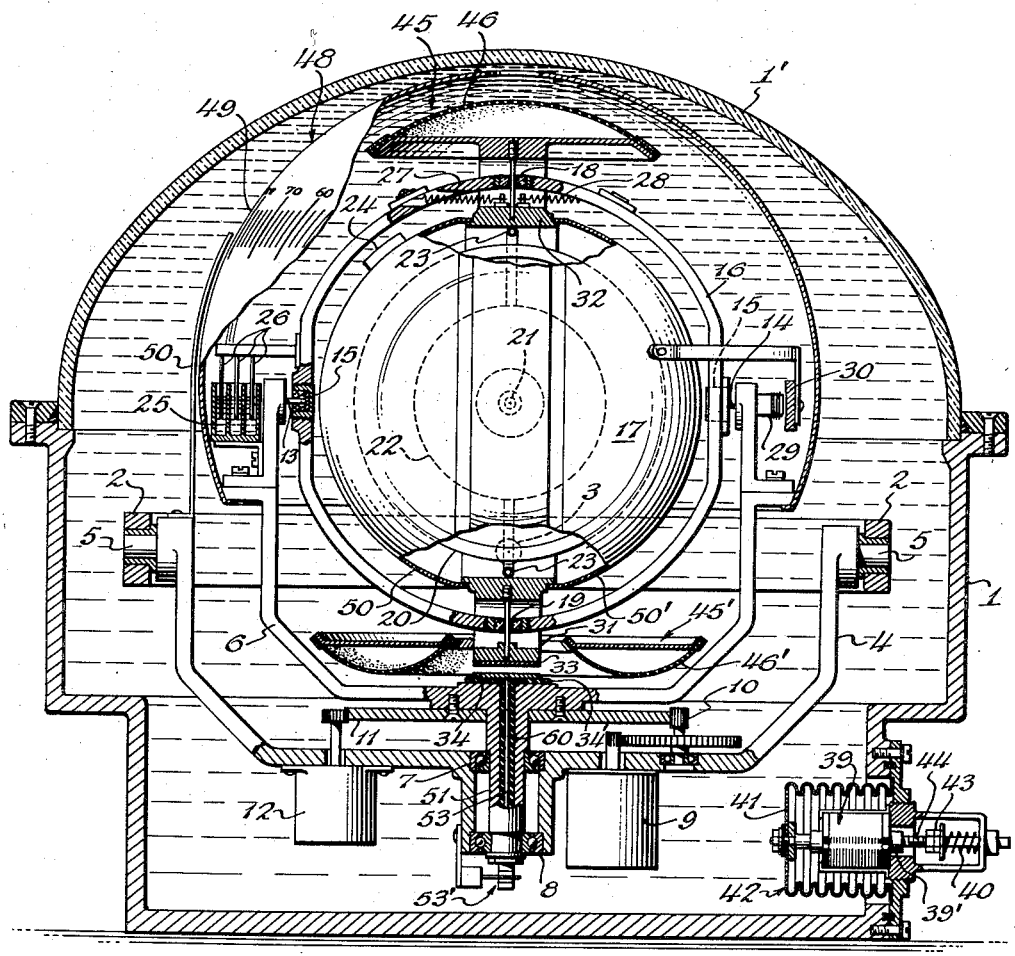
Fig. 2 is a simplified wiring diagram of the clearance responsive pick-off controlling the pressure of the fluid within the container.
Figure 3:
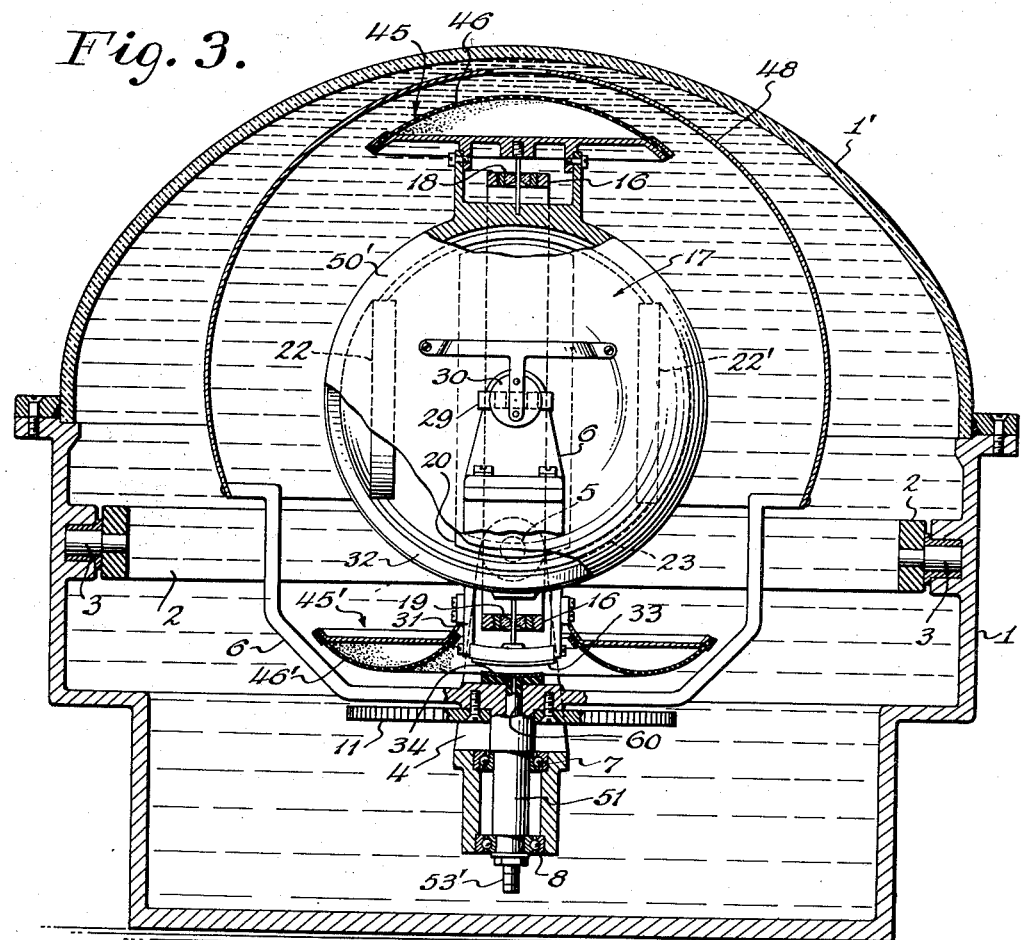
Fig. 3 is a view similar to Fig. 1 showing the compass element in east-west elevation.

I propose to enclose the entire gyroscopic compass or other gyroscopic element in an outer liquid-tight casing 1, shown as provided with a transparent dome-shaped top 1', through which the compass is visible. Within said case or dome, I pivotally support a binnacle or gimbal ring 2 on horizontal axis 3, said ring pivotally supporting the main frame 4 of the compass on horizontal axis 5. The follow-up framework 6 of the compass is supported for rotation about a vertical axis within the main frame 4 on vertical guide and thrust bearings 7 and 8, both of which may be near the bottom of the frame and guide the vertical stub shaft 51 extending downwardly from ring 6. The follow-up support 6 is shown as rotated from a follow-up or servomotor 9 through reduction gearing 10, driving azimuth gear 11 fixed to the follow-up frame. The upper portion of the follow-up support 6 is shown in the form of a dome 48 which may be provided with compass markings 49 read on a lubber line 50 fixed to frame 4. It also acts as a swirl shield to reduce the drag of the liquid, if swirling, on the sensitive element. The course transmitter 12 is shown as geared to said gear 11 to transmit the readings of the compass to repeater compasses (not shown). Frame 6 is shown as U-shaped or forked, supporting at its upper end horizontal pivots or trunnions 13, 14, journalled in bearings 15 in the vertical or gimbal ring 16. Said ring in turn slidably supports the rotor bearing framework or casing 17 in vertical guide bearings 18 and 19. The rotor casing 17 supports the rotor 20 for spinning about a normally horizontal axis 21 in rotor bearings (not shown). Meridian-seeking properties may be imparted by any suitable means such as a liquid ballistic comprising a pair of liquid containers 22, 22', secured to or in the case and connected by a restricted pipe 23. Said containers are shown as secured within the case to the interior of meridian ring 32 which forms the backbone of the rotor case 17. The shell of the case is formed of two hollow hemispherical shells 50, 50' fitted to flanges on ring 32 to form a closed air and liquid-tight casing.

For illustrative purposes, I have shown a compass of the type in which the major axis is horizontal and the minor axis vertical, which type of compass is preferably damped by an eccentric mass 24 on the west side of the rotor casing. It is obvious that my invention is equally applicable to other types of gyro compasses having more usual forms of dampers.

Current is shown as introduced across the horizontal axis by a plurality of open top mercury containers 25 mounted on the ring 6 and into which fingers 26 connected to the vertical ring 16 dip. Current is shown as lead across the vertical axis by fine torsionless wires 27, 28. The controller or pick-off for controlling the servomotor 9 is shown as of the usual E inductive type having three wound cores 29 on the follow-up ring 6 and an armature 30 secured to the rotor casing 17.

The entire interior of the housing 1 is normally filled with a liquid having a specific gravity such as to just float the entire sensitive element without either downward or upward thrust on the bearings. Since, however, variations in temperature conditions cause a change in the specific gravity of the liquid relative to that of the compass ensemble, I provide additional means to maintain the desired neutral condition at all times. For this purpose, I provide preferably at the bottom of the compass a pick-off sensitive to the vertical clearance between the sensitive and follow-up elements. For this purpose, I have shown a U-shaped extension 31 extending downwardly from the central ring 32 of the rotor case and on the bottom of this extension I have shown a plate 33 acting as a part of a condenser. The complementary plate 34 of the condenser is mounted on the bottom of the follow-up ring 6. Plate 34 is shown as well insulated from the metallic vertical ring 6 and its shaft 51 by insulating plate 34' and insulating sleeve 60 which extends through the hollow vertical stub shaft 51 forming the downward extension from the follow-up ring 6. The lead-in wire 53 to the plate 34 is shown as passing through said insulating sleeve to the slip ring and contact 53'. Said condenser is arranged so as to control a means for changing the pressure of the liquid in the container 1 to decrease the pressure when the condenser plates approach each other closer than a predetermined limit and to increase the pressure in case the condenser plates become spaced more than a predetermined limit. For this purpose, the condenser may be placed in a Wheatstone bridge such as illustrated in Fig. 2 in which said condenser forms one arm of the bridge in series with a resistor 35, while a fixed condenser 36 is placed in the other arm in series with resistor 37. A high frequency oscillator 38 is connected across two points of the bridge as illustrated. An output will then be obtained across the other points which varies with the capacitative reaction of the condenser 33, 34, the amplified output of which is shown as exciting a solenoid 39. The plunger or core 39' of said solenoid is normally biased in one direction by spring 40, which is shown as a compression spring, to push outwardly the outer wall 41 of the sylphon 42 within the liquid, while sufficiently strong excitation of the solenoid will tend to pull said wall inwardly. Preliminary adjustment of the tension of the spring 40 may be secured by adjusting the washer and nut 43 on the threaded stem 44 of the core. It may readily be seen that as the wall 41 is pushed outwardly, a pressure within the liquid casing 1 will be increased while it will be decreased as the wall is pulled inwardly. Preferably the condenser and its amplifying circuit are made very sensitive to minute changes in clearance. Bearings 18 and 19 act only as guide bearings, therefore. Condenser 36 and resistors 35 and 37 are manually adjusted for initial adjustment.

On the immersed sensitive element of the compass, I provide a means responsive to the varying pressure in the liquid for sequentially varying the mean specific gravity of the element so as to maintain it equal to that of the liquid. In other words, so that the weight of the liquid displaced by the element is equal to that of the element. To this end, I have shown secured to the central ring 32 of the rotor case a container 45 having a flexible or collapsible wall 46 and adapted to be filled with air or other compressible gas at a moderate pressure such as atmospheric pressure. It is obvious, therefore, that the volume of liquid displaced by the container 45 will vary with the expansion of the diaphragm 46 and this in turn will vary inversely with the pressure of the liquid. Therefore, the control circuits of Fig. 2 are so designed that if the condenser plates 33, 34 approach closer than the desired distance, the current through solenoid 39 is increased to collapse further the sylphon 42 and thereby reduce the pressure on the liquid. This will consequently result in slight raising of the diaphragm 46 and, therefore, lessening of the specific gravity of the element. In case the condenser plates become separated, however, more than a predetermined amount, the reverse takes place with a result that the sensitive element will sink to maintain the proper distance. This eliminates substantially all load on the horizontal and vertical bearings and thus bearings may be of the simple, jewel type employed in watches and clocks.

In the construction above described, there would remain, however, a slight load on the horizontal bearings 13 and 14 if the mean density of the vertical ring and all its supported parts were greater than that of the liquid. To avoid this, I propose to construct the vertical ring and most of its supported parts of magnesium, one of the lightest metals known, and to use a liquid of the same specific gravity as magnesium as the flotation liquid. Such a liquid is on the market under the trade-name fluorolube. Or, if a heavier metal is used, floatation chambers could be used on the vertical ring to decrease its weight until supported by the liquid, similar to 45.

In the type of gyroscopic compass shown in which the major axis is horizontal, it is desirable to so design the expansible float chamber arrangement so that the center of gravity of the system remains along the horizontal axis 13, 14, regardless of temperature changes. Therefore, in this type of compass, I prefer to place an additional expansible chamber 45' at the bottom of the rotor case 17 as well as at the top to prevent any vertical shift in the center of gravity of the system. This also has the advantage of preventing any lateral thrust on the vertical guide bearings 18, 19 in case of tilt of the compass. This chamber may be similar to the chamber 45. The shape of the chamber, however, has been changed to provide clearance for the condenser plate 33 and its bracket by making the chamber doughnut shaped as shown, with the annular flexible bottom 46'.

Figure 4:
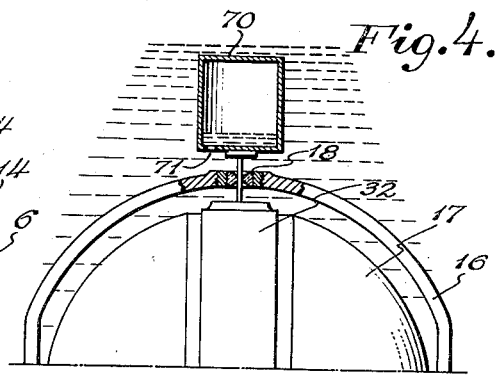
Fig. 4 is a partial view similar to Fig. 1, showing one modification my invention may assume.

My invention may assume many different embodiments within the scope of the appended claims. One such embodiment is illustrated generally in Fig. 4, in which the expansible float chambers are replaced by hollow containers 70 which may be mounted on the gyro spherical casing 17 as are chambers 45 and 45', but which have no flexible walls. Instead, each container is entirely closed except for one or more small holes 71 near or in the bottom of the same permitting liquid flow into and out of the interior of container 70 and the interior of the main casing 1. Air is trapped in the upper portion of said container with liquid filling the lower portion. Therefore, when the pressure of the main liquid is increased, the level of the liquid within the container 70 will rise until balanced by the pressure of the trapped air, thereby increasing the mean density of the gyro casing. The action, therefore, is comparable with the action of the float chamber 45. Chamber 70 may be duplicated at the bottom of the compass if desired, as was the float chamber 45' in Fig. 1.

Figure 5:
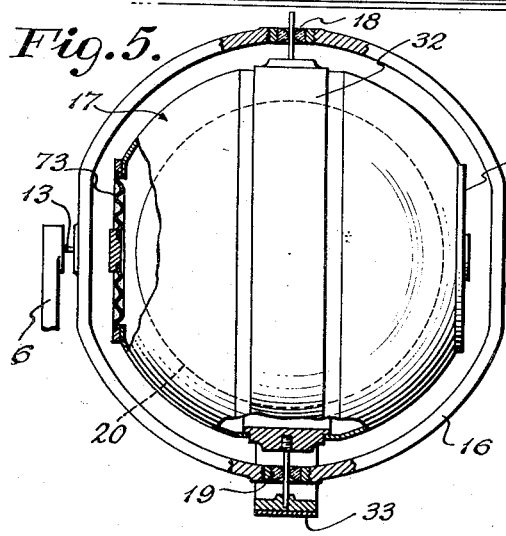
Fig. 5 is a detail of the gyroscopic element or sphere showing still another modification.

Still another even simpler modification is shown in Fig. 5. According to this modification, the sealed sphere 17 which encloses the gyro rotor is made in part at least flexible so that the walls will push in and out slightly as the pressure of the outer liquid is increased or decreased. To illustrate this, the sheet metal in the spherical end caps 50 and 50' is provided with flexible end buttons 73, 74. Since the interior of the case is filled with air or other gas, such as helium, the expansion and contraction of the end buttons bring about the same phenomena and have the same effect as with the float chambers 45 and 45'.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Thus, I have illustrated several of the many methods that may be employed to keep the buoyancy of the gyro element in the liquid, neutral and constant. It is also obvious that other pick-off means than the variable condenser arrangement 33, 34 may be employed as the controller responsive to the vertical position of the sensitive element in its follow-up support which controls the pressure in the liquid. Thus, known inductive or photo-electric pick-offs, or the resistance of the liquid might be used instead of the condenser pick-off shown within the scope of the dependent claims.

What is claimed is:

1. Gyroscopic apparatus comprising a liquid-tight container normally filled with a liquid, a sensitive element universally mounted therein, including a gimbal support pivotally mounted in said container and a gyroscope pivotally mounted in said support, said gyroscope including a hollow sealed rotor case; and a float chamber secured to said element to vary its mean specific gravity to that of the liquid, said chamber having a yielding wall.

2. Gyroscopic apparatus comprising a liquid-tight container normally filled with a liquid, a sensitive element universally mounted therein, including a gimbal support pivotally mounted in said container and a gyroscope pivotally mounted in said support, said gyroscope including a hollow sealed rotor case, a float chamber having a yielding wall secured to said element, means responsive to the vertical clearance of said element within said container, and variable pressure means controlled by said other means which varies the pressure in the liquid in said container upon variation of said clearance thereby maintaining the clearance constant.

3. Gyroscopic apparatus comprising a liquid-tight container normally filled with a liquid, a sensitive element universally mounted therein, including a gimbal support pivotally mounted in said container about a horizontal axis, a gyroscope pivotally mounted in said support on a vertical axis, said gyroscope including a hollow sealed rotor case, a float chamber having a yielding wall secured to said gyroscope, signal means responsive to upward or downward displacement of said case in said gimbal from normal, and means controlled by said signal for varying the pressure within said liquid to maintain the gyroscope suspended weightlessly in the liquid.

4. Gyroscopic apparatus comprising a liquid-tight container normally filled with a liquid, a sensitive element universally mounted therein, including a gimbal support pivotally mounted in said container and a gyroscope pivotally mounted in said support, said gyroscope including a hollow sealed rotor case having a flexible wall permitting movement thereof upon change in pressure of the liquid surrounding the case to vary the buoyancy of the case, means responsive to the vertical clearance of said element within said container, and variable pressure means controlled by said other means which varies the pressure in the liquid in said container upon variation of said clearance thereby maintaining the clearance constant.

5. Gyroscopic apparatus comprising a liquid-tight container normally filled with a liquid, a sensitive element universally mounted therein, including a gimbal support pivotally mounted in said container about a horizontal axis, a gyroscope pivotally mounted in said support on a vertical axis, said gyroscope including a hollow sealed rotor case having a flexible wall permitting movement thereof upon change in pressure of the liquid surrounding the case, signal means responsive to upward or downward displacement of said case in said gimbal from normal, and means controlled by said signal for varying the pressure within said liquid to maintain the gyroscope suspended weightlessly in the liquid.

6. Gyroscopic apparatus comprising a liquid-tight container normally filled with a liquid, a sensitive element universally mounted therein, including a gimbal support pivotally mounted in said container and a gyroscope pivotally mounted in said support, said gyroscope including a hollow sealed rotor case, and a smaller sealed container secured to said case having an aperture in the bottom thereof to permit interchange of liquid between the interior of said second container and the liquid in said outer container whereby the level of liquid trapped in said second container varies with the change in pressure of the liquid in the outer container.

7. Gyroscopic apparatus comprising a liquid-tight container normally filled with a liquid, a sensitive element universally mounted therein, including a gimbal support pivotally mounted in said container about a horizontal axis, a gyroscope pivotally mounted in said support on a vertical axis, said gyroscope including a hollow sealed rotor case, a second smaller container secured to said gyroscope having an opening near the bottom thereof permitting air to be trapped in the top thereof, signal means responsive to upward or downward displacement of said case in said gimbal from normal, and means controlled by said signal for varying the pressure within said liquid to maintain the gyroscope suspended weightlessly in the liquid.

8. Gyroscopic apparatus comprising a liquid-tight container normally filled with a liquid, a sensitive element universally mounted therein, including a gimbal support pivotally mounted in said container about a horizontal axis, a gyroscope pivotally mounted in said support on a vertical axis, said gyroscope including a sealed rotor case having a wall construction permitting movement thereof upon change in pressure of the liquid surrounding the case, spaced cooperating condenser plates positioned respectively on said element and container, circuit means including said plates for producing a signal upon variation in the spacing between said plates, and means controlled by said signal for varying the pressure within said liquid to maintain the element suspended weightlessly in the liquid and properly spaced from its support.

9. A gyroscope of the directional type comprising a liquid-tight container, a sensitive element comprising a gyro rotor and sealed rotor case, a vertical ring within which said case is journalled for freedom about a vertical axis, a follow-up support in which said vertical ring is journalled for freedom about a horizontal axis, a liquid within said container within which said element, vertical ring and follow-up support are wholly immersed, said ring being composed of a material having substantially the same specific gravity as said liquid and said sealed casing also having a mean specific gravity substantially the same as said liquid, whereby said element may be journalled in said ring on vertical guide bearings without vertical thrust and said ring will be supported in said support without pressure on its horizontal bearings.

10. Gyroscopic apparatus as claimed in claim 9, in which predetermined clearance is maintained between the gyroscopic element and its supporting members by means of an electrical pick-off and means for varying the pressure in said liquid by the output of said pick-off, whereby the volume of the liquid displaced by said case is altered sufficiently to keep said case weightlessly floated in the liquid.

11. A gyroscope of the directional type comprising a liquid-tight container, a sensitive element comprising a gyro rotor and sealed rotor case, a vertical ring within which said case is journalled for freedom about a vertical axis, a follow-up support in which said vertical ring is journalled for freedom, a universal mount for said support including a normally horizontal gimbal ring, a liquid within said container within which said element, vertical ring, follow-up support and mount are wholly immersed, at least said vertical ring being composed of a material having substantially the same specific gravity as said liquid, and said sealed casing also having a mean specific gravity substantially the same as said liquid, whereby said element may be journalled in said ring on vertical guide bearings without vertical thrust and said rings will be supported in said support and mount without pressure on their horizontal bearings.

12. Gyroscopic apparatus comprising a liquid-tight container normally filled with a liquid, a sensitive element universally mounted therein, including a gimbal support pivotally mounted in said container and a gyroscope pivotally mounted in said support, said gyroscope including a hollow sealed rotor case, a float chamber secured to said element to vary its mean specific gravity to that of the liquid, said chamber having a yielding wall, a two-part capacitive pickoff, one part being fixed to said case and the other supported by said container, whereby its output varies with the relative spacing of said parts, and means responsive to the output of said pickoff for varying the pressure within said liquid whereby the volume of liquid displaced by said case is altered sufficiently to keep said case floated in the liquid without weight or buoyancy.

13. Gyroscopic apparatus comprising a liquid-tight container normally filled with a liquid, a sensitive element universally mounted therein including a gimbal support pivotally mounted in said container and a gyroscope pivotally mounted on said support, said gyroscope including a hollow sealed rotor case, a float chamber carried by said element having a yielding wall subject to the pressure of the liquid operable to change the liquid displacing volume of the element so as to maintain its specific gravity equal to that of the liquid, means for varying the pressure of the liquid within the container, and means for operating said liquid pressure varying means to maintain a predetermined vertical clearance between the element and the container.

References Cited in the file of this patent

UNITED STATES PATENTS

| | | |
|---|---|---|
| 730,613 | Cox | June 9, 1903 |
| 1,743,533 | Davis | Jan. 14, 1930 |
| 2,260,396 | Otto | Oct. 28, 1941 |
| 2,618,159 | Johnson et al. | Nov. 18, 1952 |